United States Patent [19]

Fouts et al.

[11] Patent Number: 5,427,722
[45] Date of Patent: Jun. 27, 1995

[54] PRESSURE SLIP CASTING PROCESS FOR MAKING HOLLOW-SHAPED CERAMICS

[75] Inventors: Richard E. Fouts, Grand Blanc; Robert P. Johnston, Davison, both of Mich.

[73] Assignee: General Motors Corporation, Detroit, Mich.

[21] Appl. No.: 76,230

[22] Filed: Jun. 11, 1993

[51] Int. Cl.[6] ............................................. C04B 33/28
[52] U.S. Cl. ........................................ 264/87; 264/86
[58] Field of Search .................................... 264/86, 87

[56] References Cited

U.S. PATENT DOCUMENTS

| | | | |
|---|---|---|---|
| 4,737,326 | 4/1988 | Wirth et al. | 264/87 |
| 4,814,127 | 3/1989 | Toyoda | 264/87 |
| 4,816,182 | 3/1989 | Novich | 264/86 |
| 4,840,763 | 6/1989 | Freitag | 264/87 |
| 4,882,111 | 11/1989 | Murata | 264/87 |
| 4,884,959 | 12/1989 | Ito et al. | 425/84 |
| 4,913,640 | 4/1990 | Spieler et al. | 425/195 |
| 4,913,868 | 4/1990 | Ito et al. | 264/135 |
| 5,087,399 | 2/1992 | Neil et al. | 264/62 |
| 5,148,852 | 9/1992 | Oishi | 164/169 |
| 5,156,856 | 10/1992 | Iwasaki et al. | 264/87 |

*Primary Examiner*—James Derrington
*Attorney, Agent, or Firm*—Cary W. Brooks

[57] ABSTRACT

A method of making a hollow-shaped green ceramic article by pressure slip casting in a slip casting mold having a porous mold part with porosity channels opening at the surface of the mold cavity. A slip composition is formed having solid phase components with an average particle size distribution less than the cross-sectional dimension of mold porosity channels, and also having a flocculating agent to cause agglomeration of the solid phase particles into floccules larger than the porosity channel dimension.

The molding cavity is filled with the slip composition, and the same is then hydrostatically pressurized while withdrawing slip filtrate from the mold cavity via the mold porosity channels for a time sufficient to deposit to a desired thickness a layer of solids. Excess slip is then removed from the molding cavity to provide an exposed interior surface on the deposit layer. Air under pressure is then applied to the exposed interior surface of the deposit layer, preferably while also withdrawing slip filtrate via the mold porosity channels from the mold cavity surface-deposit layer interface. The slip casted green ceramic hollow article is removed from the mold only after sufficient water has been removed in situ from within the material of the green ceramic article to enable the same to be self-supporting.

11 Claims, 2 Drawing Sheets

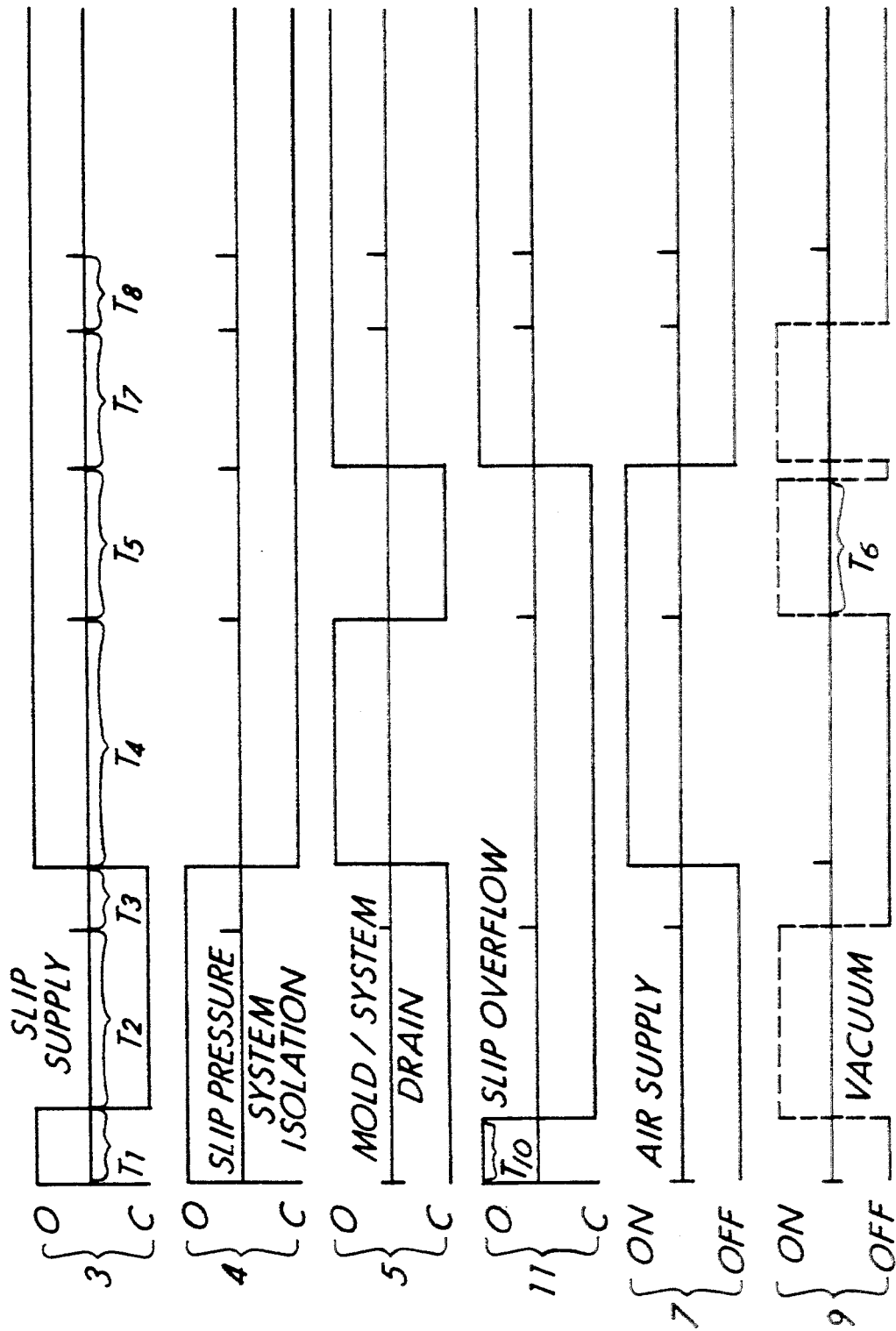

5,427,722

PRESSURE SLIP CASTING PROCESS FOR MAKING HOLLOW-SHAPED CERAMICS

FIELD OF THE INVENTION

The present invention relates to pressure slip casting, and more particularly to a process for pressure slip casting hollow articles, such as green ceramic components suitable for sintering in their as-cast form.

BACKGROUND OF THE INVENTION

Pressure slip casting involves the use of porous plastic molds to fabricate green ceramic components. It has advantages over conventional non-pressurized slip casting processes in that the cycle time is reduced, as well as part-to-part variation, and material properties are improved. Pressure slip casting is currently used in industry for producing green ceramic parts from high clay content compositions with relatively coarse particle size distributions. For example, see the article entitled "Bodies for Fast-Cycle Sanitaryware Production" by M. Vouillemet et al, published in *Interceram*, Vol. 39, No. 1, 1990, pp. 17-23. Commercially available pressure slip casting machines and the technology to fabricate porous plastic molds are available from various machine manufacturers. An example of one such manufacturer is NETZSCH Inc.

In the pressure slip casting process, the mold employed has both passages for draining the water, which is forced from the molding surface of the mold out of the mold cavity via a porous mold layer to the outside of the mold during the high pressure phase of the slip casting cycle, as well as passages for supplying compressed air and water into the porous layer to spurt water or air through the porous layer and out into the molding cavity from the molding surface when the cast product is to be removed from the mold. If the mold is constructed of an upper part or top part and a lower or bottom part, for example, the product can not be removed simultaneously from the upper and lower parts. In one current technique of demolding, therefore, one mold part is evacuated by applying vacuum to attract the product, whereas the other mold part is supplied with compressed air to remove the product. Then, the vacuum is released to supply compressed air to that one part thereby to remove the product. The mold passages are also used to evacuate the porous layer during the demolding step, and for mold flushing and cleaning. Further background information relative to pressure slip casting mold construction and methods of making of molds may be found in U.S. Pat. Nos. 4,884,959; 4,913,640; 4,913,868; 5,087,399; as well as certain of the references cited therein.

In slip casting, a ceramic powder which may consist of a wide variety of clay, silicas and silicon compounds, as well as various metal oxides, is mixed with appropriate additives to promote densification and to impart the desired material properties in the final structure. This powder is mixed with a liquid vehicle, typically water, as well as with dispersants and organic binder in such a way that the mixture attains a suitable low viscosity for pouring or pumping into a porous mold. The porous mold absorbs excess liquid vehicle, leaving a solid compound of ceramic powder and binder, saturated with liquid vehicle in the spaces between ceramic particles. The mold thus acts as a filter, the water being the filtrate, whereas the solid particles in suspension and separated out in this filtering action are left behind as a build-up layer on the wall of the mold cavity to form a hollow article (or a solid article, if desired) having an exterior surface complemental to the shape of the mold cavity surface. The pressure slip casting is then removed from the mold and dried to remove the residual liquid vehicle. The organic binder may be removed by a thermal process involving liquification, pyrolysis and distillation. The resulting porous ceramic green body may be densified and strengthened by hot isostatic pressing or kiln sintering.

Some relatively recent research and development efforts directed to pressure slip casting processes have been focusing on the problems associated with applying this process in porous plastic molds for producing hollow-shaped green ceramic components from slip compositions with little or no clay content and submicron particle size distributions. Since the filtering channels in the porous plastic mold material are usually no smaller than 50 to 150 microns in cross-section in order to maintain adequate mold porosity to achieve practical production cycle times, the challenge in casting these submicron particle size compositions has been to adjust the casting slip properties and molding process parameters so that a firm layer of particulate material will build-up on the porous plastic mold surface when hydrostatic pressure is applied to the casting slip. If such submicron particles are fully dispersed in the liquid vehicle, such solid particles will pass through the channels in the mold while entrained in the liquid vehicle without any of the desired build-up occurring on the mold cavity surface. In attempts to overcome this problem, a casting slip composition was modified to include a suitable flocculator to cause the slip composition solid particles to aggregate into small, loosely aggregated masses of material suspended in the liquid vehicle. If the casting slip is so flocculated, the floccules are too large in size to pass through the mold porosity channels and the desired build-up of solids on the mold cavity surface can be achieved.

However, it was then found that the degree of flocculation required to achieve successful slip casting with slip compositions having such submicron particle size distributions does not allow enough water removal from the casting layer flocculus during the conventional in situ water removal process step, at least within the cycle time constraints required to achieve economical production. Hence, at the end of this step, an excessive amount of water is retained in this cast layer. This in turn results in an as-cast part that lacks sufficient strength to be self-supporting when removed from the mold. Accordingly, the part will slump and deform from its intended shape due to its own weight before enough water can be removed in post-molding drying operations.

OBJECTS OF THE INVENTION

Accordingly, it is an object of the present invention to provide a new and improved method of successfully pressure slip casting hollow-shaped green ceramic components from slip compositions having very small particle size distributions relative to mold porosity, and which overcomes the problems of excessive entrainment with the liquid vehicle filtrate and resultant little or no solid build-up on the mold cavity surface, and which can be produced utilizing conventional pressure slip process equipment.

Another object of the present invention is to provide a pressure slip casting method of the aforementioned character which enables the slip composition to be flocculated by appropriate additives to promote rapid build-up on the mold cavity surface of solids during the hydrostatic pressure phase of the casting process, and which also enables sufficient water to be removed from the flocculus build-up in situ so that the as-cast hollow-shaped green ceramic component when removed from the mold has sufficient strength to be self-supporting for practical handling in subsequent operations without part deformation or other defects resulting from inadequate structural strength at demolding.

A further object is to provide a pressure slip casting method of the aforementioned character which is capable of accomplishing the foregoing objects without increased cycle time penalties.

Another object is to provide a method of foregoing character which enables the use of slip compositions with little or no clay content and submicron particle size distributions in mold constructions having relatively high porosity as utilized in conventional pressure slip casting machines and equipment normally used to produce hollow-shaped green ceramic components, such as dinnerware and sanitary ware products, from high clay content slip compositions without requiring expensive additions to or alterations in such commercial pressure slip casting equipment.

Advantageously, the invention facilitates formation of products having properties only achievable using submicron particles. The fired properties of such products are only possible using the precursor particles in the method of the invention.

BRIEF DESCRIPTION OF THE DRAWINGS

These and other objects, features and advantages of the present invention will become apparent from the following detailed description of the preferred embodiments, appended claims and accompanying drawings, in which:

FIG. 2 is a timing diagram illustrating the interrelated sequence of operation of the various components of the circuitry of FIG. 1 in practicing the method of the present invention.

DETAILED DESCRIPTION OF THE PREFERRED EMBODIMENTS

Figure 1:
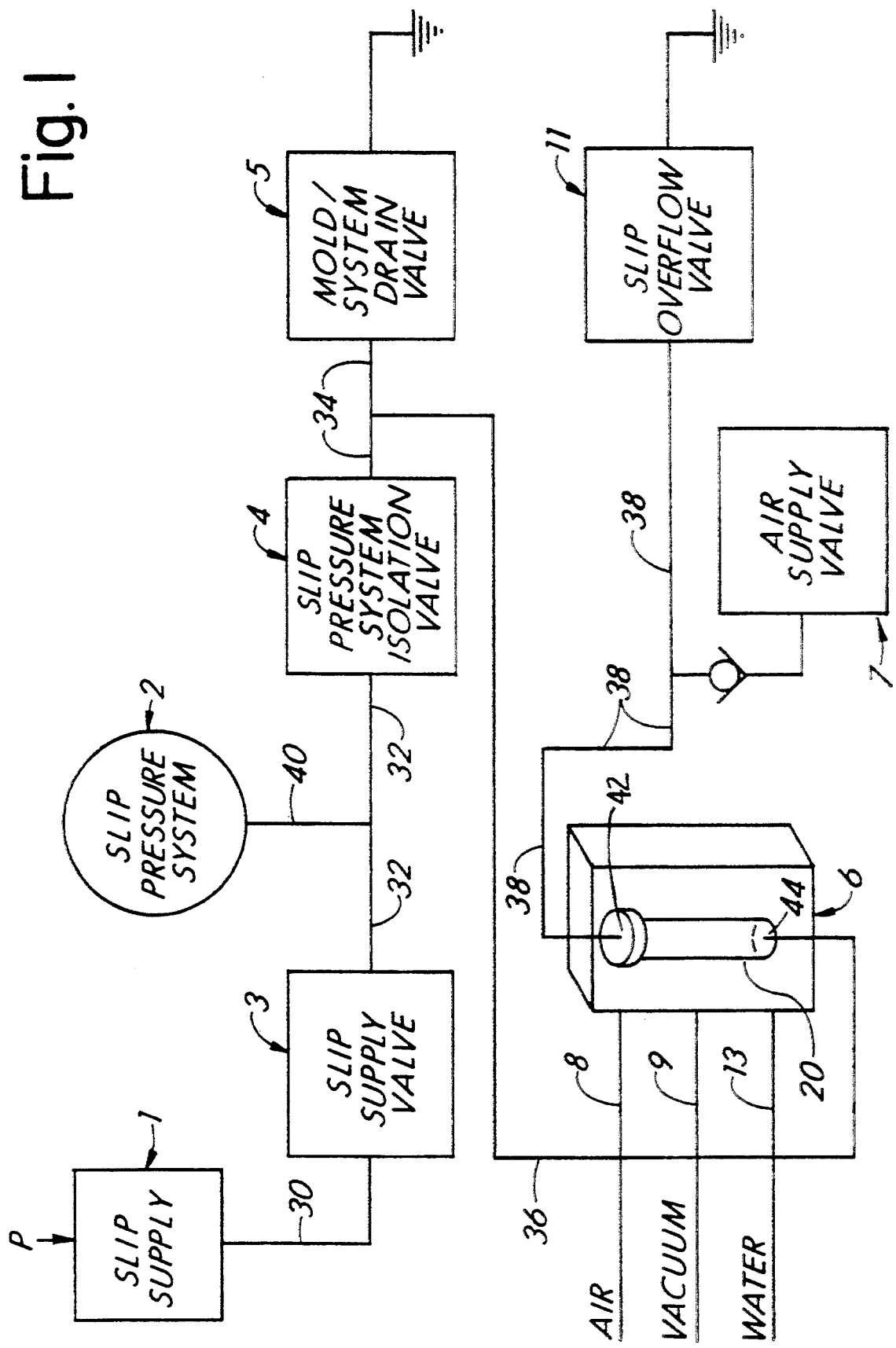
FIG. 1 is a schematic diagram of the hydraulic circuitry and associated components of a conventional pressure slip casting machine and the associated conventional pressure slip casting mold, as modified and operated in accordance with the present invention in accordance with an exemplary but preferred embodiment thereof.

By way of illustration and not by way of limitation, the method of the present invention may be successfully practiced utilizing a commercially available pressure slip casting machine with automatic programmable cycle control. One such machine is available from NETZSCH Inc., model number 225.01, as modified to practice the method of the invention as described in more detail hereinafter.

Referring in more detail to FIG. 1, the hydraulic circuitry and associated components of a basic system are, for example, available in a NETZSCH machine which is one of many available for performing a slip casting cycle utilizing a slip casting mold as illustrated schematically. The system includes a slip supply tank 1, a slip pressure system 2, a slip supply valve 3, a slip pressure system isolation valve 4, a mold system drain valve 5, a slip casting mold 6, an air supply valve 7, with an air pressurizing line 8, a water line and a vacuum line 9 each connected to the backside of mold 6, and a slip overflow valve 11.

Mold 6 may be a conventional two-part or three-part mold, only one part being shown to illustrate the cylindrical shaped mold half-cavity 20 therein. The NETZSCH Inc. casting machine prior to such modification is intended for conventional ceramic industry pressure slip casting of dinnerware using a slip composition having a relatively large particle size and a high percentage of clay in the slip composition. Mold 6 thus can be and is made from relatively porous plastic material having channels in the order of 100 microns in cross-section to promote rapid filtering, demolding and flushing times in the casting cycle.

In the conventional operation of this NETZSCH machine, the same may be programmed to automatically perform the following process steps:

1) The porous plastic mold 6 is clamped shut.
2) Valve 3 and the valve 4 are opened to allow slip from the slip tank 1 to flow via supply lines 30, 32, 34, 36 and to mold cavity 20. Excess slip is allowed to flow out of the mold cavity 20 during the fill cycle via line 38 through valve 11 to a collection reservoir for reuse and return to tank 1.
3) After mold cavity 20 is filled with slip, valve 11 is closed and then the valve 3 is closed. Hydrostatic pressure is then applied to the slip trapped in the mold cavity by the pressure system 2, the working chamber of which communicates via line 40 with line 32. The hydrostatic pressure applied to the slip in the mold cavity 20 may rise to a value of about 600 psi during this deposition pressurizing step. Water in the casting slip is forced out by this pressure through the porous plastic mold 6, and is removed via vacuum line 9 which is operated to apply vacuum to the backside of mold 6. This causes a layer of the solid particulate material, held in suspension in the water vehicle of the slip, to build-up on the interior surface of mold cavity 20.
4) Once a layer of solid material of the desired thickness is achieved, the pressure applied by pressure system 2 is relieved. Valve 4 is then closed and valve 5 is opened to thereby remove (by gravity-induced flow) the remaining casting slip from cavity 20 of mold 6.
5) Valve 7 is then opened and pressurized air, at a relatively low pressure of about 15 psi, flows at a high volumetric flow rate through line 38 into and through the hollow interior of the hollow cast part, the air flow entering the part at one end inlet 42 and exiting via an opposite end mold cavity outlet 44 communicating with line 36. This blow out and drying air flows via line 36 and valve 5 to atmosphere. This hollow cast air blow cycle is continued for a time sufficient to dry the inside of the hollow cast part. During this blow dry cycle, additional water is removed from the slip casting by applying vacuum via line 9 to the backside of the mold. Also, during the hollow cast blow cycle, valve 5 remains open, as does valve 3, valve 4 remaining closed during and after this cycle.
6) Once the desired moisture content of the in situ part is achieved, valve 7 is closed, and then valve 11 is opened. The porous plastic mold 6 is then opened and the part removed.

Although the above-described NETZSCH Inc. machine operates satisfactorily employing the above-described mode of operation to successfully pressure slip cast green ceramic parts from high clay content compositions with relatively coarse particle size distributions, such has been found not to be the case with respect to production of hollow-shaped green ceramic components from slip compositions with little or no clay content, and submicron particle size distributions. Since the channels in the porous plastic mold 6 are in the order of 100 microns in cross-section, if the casting slip is fully dispersed it will pass through these channels in the mold without any build-up on the mold surface.

Hence, in accordance with one feature of the present invention, the submicron particle size slip composition is modified by adding a suitable flocculating agent to cause the solid particles of the water molecules to agglomerate into soft floccules which are too large to pass through the mold channels. Hence, during the hydrostatic pressurizing step, as the slip initially is being forced into the mold channels the ceramic flocks in the mold cavity slurry or slip start building up on the inside surface of the mold cavity. These initially blocking floccules act as a filtering layer superimposed on the mold cavity surface and serve to catch and entrain more and more of the fine solid particles to increase the solids layer depositing on the mold cavity surface even as water is being removed from the mold cavity via line 9.

However, despite the continuance of the vacuum water draw-out via line 9 during the hydrostatic pressurizing step, and despite the further hollow cast blow down cycle described above, an excessive amount of water is retained at this stage in the cast layer because of the flocked nature of the slip. If demolded at this point in the cycle, the as-cast part will slump when removed from the mold. At this stage, the as-cast part is too soft for mold removal even though it has been highly pressurized in the hydrostatic pressurizing step and then air blown through the hollow cast blow down step. This condition is believed to be due to the inability of the hollow cast blow cycle pressure to break the weak cross-linking bonds between the solid particles and the water; these bonds being a result of the state of flocculation in the slip and natural surface tension; resulting in an excessive moisture content in the as-cast part so that it lacks sufficient free-state structural integrity to be self-supporting.

In the course of development of the present invention, it was also found that this excessive retained moisture content in the as-cast part could not be overcome by increasing the vacuum water withdrawal cycle time, and/or by increasing the hollow cast air blow time through the hollow interior of the casting. Although blowing air through the hollow interior would dry the interior surface of the hollow cast part, and although applying vacuum to the outside of the cast part would suck water away from the exterior surface of the part, nevertheless these steps, either alone or together, would not remove sufficient water from the flocculated deposit formed between the interior and the exterior surfaces of the hollow part. Indeed, once the vacuum had drawn the water away from the exterior surface of the part, it would merely draw air from the rest of the mold rather than from within the deposited agglomeration.

It was also found that modification of casting slip properties in terms of varying viscosity, percent solids, etc., did not overcome the problem. Moreover, molding parameters, such as casting pressure, casting time, vacuum time and hollow cast blow time, were varied in efforts to prevent detrimental slumping, also without success.

Finally, in accordance with another and principal feature of the present invention, it was discovered that if a high enough air pressure is applied to the inside of the hollow part, preferably at the end of, or as a substitute for a portion of the end of, the hollow cast air blow cycle, while concurrently applying vacuum to the exterior surface of the as-cast part via line 9, a sufficiently large pressure differential gradient is developed relatively uniformly radially of the hollow part (between the interior and exterior surfaces of the part) which apparently breaks the bonds between the particles and the water. This is believed to be the action occurring because it has been found that establishing this process condition causes water to be forced to the mold-casting layer interface where it is removed from the exterior surface of the casting by the vacuum applied to the mold cavity. This discovery that an interior air pressurizing-exterior vacuumizing step should be utilized in the process of pressure slip casting of hollow-shaped components enables sufficient water to be removed from the as-cast part so that when the part is removed from the mold it does not slump and will support itself for subsequent processing, e.g., kiln sintering. The resulting parts are very smooth, solid parts that are able to be handled without losing their as-cast structural shape.

Moreover, it was also discovered that this interior air pressurization of the hollow cast article could be simply achieved merely by closing valve 5 for a period of time overlapping the terminal portion of the "on" time of the hollow cast air blow cycle. This interrupts the flow-through of air through the hollow interior of the part and causes air pressure to build-up in the hollow interior of the part. In addition, in order to concurrently apply vacuum to the exterior of the part during the novel interior air pressurizing step, the source of vacuum applied via line 9 to the backside of the mold merely had to be turned back on again while valve 7 was held closed to achieve this result. Hence, the only equipment change or modification needed to practice the method of the invention was to modify the computer program controlling the machine's hydraulic circuitry. With this slight modification, the NETZSCH machine originally designed to produce green ceramic parts from high clay content compositions with relative coarse particle size distributions can now be made to work successfully and economically with slip compositions with little or no clay content and submicron particle size distributions.

Working Example

In one working example of the present invention, a slip composition was compounded as follows:

| Slip Composition (%) | Weight % |
| --- | --- |
| Aluminum oxide (Al₂O₃) | 41 |
| Titanium oxide (TiO₂) | 46 |
| Other oxides and clay | 13 |
| Total solids content | 67–72 |
| Basic pH Dispersant/ Flocculating agent | Ammonium polyacrylate (approximately 1% by weight of solids content, i.e. Darvan 821) |
| Viscosity | 1,000–3,000 Centipoise/Brookfield (Rotation Viscometer |

| Slip Composition (%) | Weight % |
|---|---|
| | Spindle #4 at 10 rpm) |

Sample Part:
Hollow cylinder for simulation of internal combustion engine exhaust port liner:

| Length | 150 mm |
|---|---|
| O.D. | 50 mm |
| Wall thickness | 3–10 mm |
| Fired weight | 150–450 gms |

Molding Parameters:

Referring to FIG. 2, the timing diagram of the interrelated operational modes of valves 3, 4, 5, 7, 9 and 11 illustrates the modification of the operation of the above-referenced NETZSCH machine to perform the method of the invention. In the foregoing working example, the cycle times (Tm) were as set forth in FIG. 2 as follows:

| $T_1$ | 10–20 sec |
|---|---|
| $T_2$ | 45–120 sec |
| $T_3$ | 5–15 sec |
| $T_4$ | 5–15 sec |
| $T_5$ | 30–120 sec |
| $T_6$ | $\leq T5$ |
| $T_7$ | 10–90 sec |
| $T_8$ | 1–5 sec |

NETZSCH Machine Operating Instructions and Mode of Operation for Working Example per FIGS. 1 and 2:

Assuming machine has been properly prepared and is ready to run in AUTO mode, beginning with selecting hollow cast and one of each from following:
cast with auto mold vacuum on/off
cast with vacuum F3 on/off
When Cycle Start button is pressed:
Guard closes
Mold closes
Mold clamp pressure is achieved
All valves are closed
T1 (T10): These times are simultaneously started.
Prefill Time (T1)
Prefill Air Relief (T10)
Valve 3 opens
Valve 4 opens
Valve 11 opens
Slip fills mold 6
At the end of T10, valve 11 closes. Slip continues to fill mold 6.
At the end of T1, valve 3 closes.
T2: Cast Time
Cast pressure goes up to pressurize slip mold 6.
If F3 "Cast with Vacuum" has been selected optionally, then the vacuum comes on at the same time the T2 (cast time) is started, and vacuum is applied via line 9.
T3: Slip Pressure Release Time
At the beginning of T3, slip pressure system 2 sucks away some of the slip away from the mold and relieves pressure from the mold 6.
At the end of T3, slip supply valve 3 opens. Valve 4 closes.
T4: Hollow Cast Blow Time At the beginning of T4, valve 5 opens. Valve 7 opens.
Air is blown between valve 11 and mold 6. This air blows slip out through the mold and valve 5.
At the end of T4, valve 5 closes.
T5 (T6): These times are simultaneously started hollow cast pressure time (T5) and hollow cast vacuum (T6)
T5 must be greater than or equal to T6.
Air is kept on to increase pressure inside the hollow interior of the slip casting in cavity 20, mold 6 and, optionally, vacuum is drawn during T6.
At the end of T6, vacuum is turned off.
At the end of T5, valve 5 opens. Valve 11 opens. Valve 7 closes.
T7: Auto Mold Vacuum Time
T7 is optional and only works when auto mold vacuum has been selected on the control panel-by turning its switch to "ON".
During T7, vacuum is drawn via line 9 on top and/or bottom parts of mold 6. At least one of these switches must be on. Otherwise, the process would stop and wait until at least one of the switches are turned on.
At the end of T7, vacuum is turned off.
T8: Part Release Time
During this time, an air blow is given via line 8 to the top part of the mold, while vacuum is being applied via line 9 to the bottom part of the mold, and mold halves are coming apart. This is necessary to release part from the top part of mold and hold the part against the bottom half of mold.
At the end of T8, mold halves are fully opened and the part is removed.
Cycle Is Complete
Flush mold 6 by running water and air through lines 8 and 13, respectively, to both halves of the mold for 10 seconds and restart cycle by pushing Cycle Start button.

It should be noted that a pressure differential generated during cycle time $T_5$ and, preferably, at least part of $T_6$ is in the range of 80–100 psi. However, this is not a relative upper limit. This range was used because the plant air supply was able to deliver such a range. Theoretically, the upper limit is determined only by the pressure which the mold is able to withstand. This is thought to be 600 psi. Conversely, the theoretical lower limit is the pressure below which water removal is so slow as to be impractical. It is suggested that the pressure be no lower than about 30 to about 35 psi. The vacuum during $T_6$ need only be sufficient to cause water to move away as it is released.

From the foregoing description it will now be understood that the method of the present invention enables pressure slip casting to be utilized in making hollow-shaped ceramic articles from slip compositions having an ultra-fine particle size distribution, on the order of 1 micron or less, at no more cost than making conventional dinnerware or sanitary ware articles from slip compositions having high clay content and relatively coarse particle size distributions. The invention thus opens the door to economical and practical manufacture of complex ceramic articles for use as structural ceramics where ultra-fine particle size is required to obtain requisite increase in ultimate part strength and other improvements in physical properties, such as maximization of percent theoretical density with or without hot isostatic pressing, uniform density throughout the part, surface smoothness, reduced porosity, etc.

While this invention has been described in terms of certain embodiments thereof, it is not intended that it be limited to the above description, but rather only by the applicable prior art and the appended claims.

We claim:

1. A method of making a green ceramic article by pressure slip casting, comprising the steps of:
   a) providing a slip casting mold including porous mold part means having a molding-cavity-defining surface and porosity channels opening thereto having a given average cross-sectional channel dimension;
   b) providing a slip composition comprising a liquid vehicle, a binder, solid phase particulate components with an average particle size distribution less than said porosity channel dimension and a flocculating agent to cause agglomeration of said solid component particles into floccules larger than said channel dimension;
   c) flowing the slip via a molding cavity inlet into the molding cavity to fill the molding cavity with the slip composition;
   d) hydrostatically pressurizing the slip composition in the molding cavity while withdrawing slip filtrate from the molding cavity via the mold porosity channels at a pressure and for a time sufficient to deposit to a desired thickness a layer of solids from slip on a molding cavity surface-deposit layer interface;
   e) removing excess slip from the molding cavity via a molding cavity outlet to provide a surface on said deposit layer exposed to the interior of the molding cavity;
   f) applying air under pressure to the exposed interior surface of said deposit layer while withdrawing slip filtrate via the mold porosity channels from the molding and cavity surface-deposit layer interface for a time and at sufficient air pressure differential to cause the air to effect a liquid vehicle drying action on said interface by flow of the air therealong and to rupture the liquid vehicle-solid particle bonds so that the liquid vehicle molecules may be forced by the use of the air under pressure from within the deposit layer to the molding cavity surface-deposit layer interface to cause liquid vehicle to be forced from within said deposit layer to said interface for withdrawal therefrom; and
   g) removing the slip casted green ceramic article from the mold after sufficient liquid vehicle has been removed from the article to cause the same to be self-supporting.

2. The method as set forth in claim 1 wherein the molding cavity has a major axis extending longitudinally thereof and the mold-cavity-defining surface defines a closed loop boundary surface when taken in transverse cross-section relative to the major longitudinal axis of the molding cavity, and wherein the exposed interior surface of the slip deposit layer defines an interior through-passage in the deposit layer to thereby define in situ from said deposit layer a hollow-shaped slip casting.

3. The method as set forth in claim 1 wherein step (d) includes applying vacuum via the mold porosity channels to the molding cavity surface-deposit layer interface.

4. The method as set forth in claim 1 wherein the withdrawing of slip filtrate via the mold porosity channels in step (f) is accomplished by applying a vacuum to said porosity channels remote from their openings at the mold-cavity-defining surface.

5. The method as set forth in claim 1 wherein the average cross-sectional dimension of said mold porosity channels ranges between about 50 to about 150 microns, and the average particle size of the slip particulate components is about 1 micron or less.

6. The method as set forth in claim 5 wherein the slip is an aqueous mixture adjusted to a basic pH and comprises said particulate components being at least one selected from the group consisting of aluminum oxide, titanium oxide and silicon oxide; and said flocculating agent which is an ammonium polyacrylate-based compound in an amount sufficient to provide said floccules.

7. The method as set forth in claim 6 wherein the concentration of said flocculating agent in said slip composition is adjusted to provide a slip composition viscosity ranging between about 1,000 to 3,000 centerpoise as per Brookfield Rotation Viscometer Spindle #4 at 10 rpm.

8. The method as set forth in claim 1 wherein, between steps (e) and (f), an additional step (h) is performed comprising flowing air through the mold cavity from the mold cavity inlet to molding cavity outlet to blow liquid vehicle out of the molding cavity and then reduce liquid vehicle content at the exposed interior surface of the deposit layer by the drying action of the flowing air moving therealong.

9. The method as set forth in claim 8 wherein step (f) is performed by closing the mold cavity air outlet to thereby terminate step (h) and cause air pressure to rise in the molding cavity substantially above the air flow-through pressure utilized and for a time sufficient to rupture the liquid vehicle-solid particle bonds so that the liquid vehicle molecules may be forced by the use of air pressure from within the deposit layer to the molding cavity surface-deposit layer interface.

10. The method as set forth in claim 1 wherein in step (f) the air pressure is allowed to rise to a value of at least about 35 psi/gauge.

11. The method set forth in claim 1 wherein a sub-atmospheric pressure is maintained inside the mold porosity channels so that the liquid vehicle forced to the interface from within the layer is sucked away from the interface via the mold channels.

* * * * *